United States Patent
Anhorn et al.

(10) Patent No.: US 6,949,306 B2
(45) Date of Patent: Sep. 27, 2005

(54) HIGH TEMPERATURE STABLE ADHESIVE

(75) Inventors: Thomas Anhorn, Dettingen (DE); Peter Schenk, Hohenstein (DE); Hans-Rainer Zerfass, Taunusstein (DE)

(73) Assignee: Elring Klinger AG, Dettingen (DE)

(*) Notice: Subject to any disclaimer, the term of this patent is extended or adjusted under 35 U.S.C. 154(b) by 145 days.

(21) Appl. No.: 10/094,588

(22) Filed: Mar. 7, 2002

(65) Prior Publication Data

US 2003/0154886 A1 Aug. 21, 2003

(30) Foreign Application Priority Data

Feb. 18, 2002 (DE) .......................... 102 06 863

(51) Int. Cl.[7] .............................. H01M 8/02; C09J 1/02
(52) U.S. Cl. ...................... 429/36; 29/623.2; 29/623.4; 106/628; 156/325
(58) Field of Search ..................... 156/325; 106/626, 106/628, 636; 429/12, 32, 35, 36, 37; 29/623.2, 623.4

(56) References Cited

U.S. PATENT DOCUMENTS

| | | | | |
|---|---|---|---|---|
| 3,053,694 A | * | 9/1962 | Daunt et al. ................. | 427/230 |
| 4,018,616 A | * | 4/1977 | Sugahara et al. ........... | 106/629 |
| 4,039,337 A | * | 8/1977 | Brown et al. .............. | 106/38.28 |
| 4,412,863 A | * | 11/1983 | Neely, Jr. .................... | 106/623 |
| 5,453,331 A | * | 9/1995 | Bloom et al. .................. | 429/32 |
| 6,165,632 A | | 12/2000 | Blum et al. .................... | 429/12 |
| 6,271,158 B1 | * | 8/2001 | Xue et al. ...................... | 501/19 |
| 6,589,661 B2 | * | 7/2003 | Neely, Jr. .................... | 428/457 |

FOREIGN PATENT DOCUMENTS

| | | |
|---|---|---|
| EP | 0 907 215 A1 | 4/1999 |
| JP | 10-158668 A * | 6/1998 |
| JP | 11162486 A | 6/1999 |
| JP | 11-315930 A * | 11/1999 |

OTHER PUBLICATIONS

English abstract for SU 569,636 A, Sep. 1977.
English abstract for SU 1595865 A, Sep. 1990.
English abstract for JP 10-195418 A, Jul. 1998.
English abstract for JP 06-060891 A, Mar. 1994.

* cited by examiner

Primary Examiner—Geoffrey L. Knable

(57) ABSTRACT

In order to provide a high temperature resistant adhesive based on water glass which is particularly suited for sticking metal substrates and which remains gas-tight and does not lose its electrical insulating properties even at high operational temperatures, it is proposed that the adhesive should comprise an additive in the form of boron nitride.

17 Claims, 2 Drawing Sheets

HIGH TEMPERATURE STABLE ADHESIVE

Figure 1:
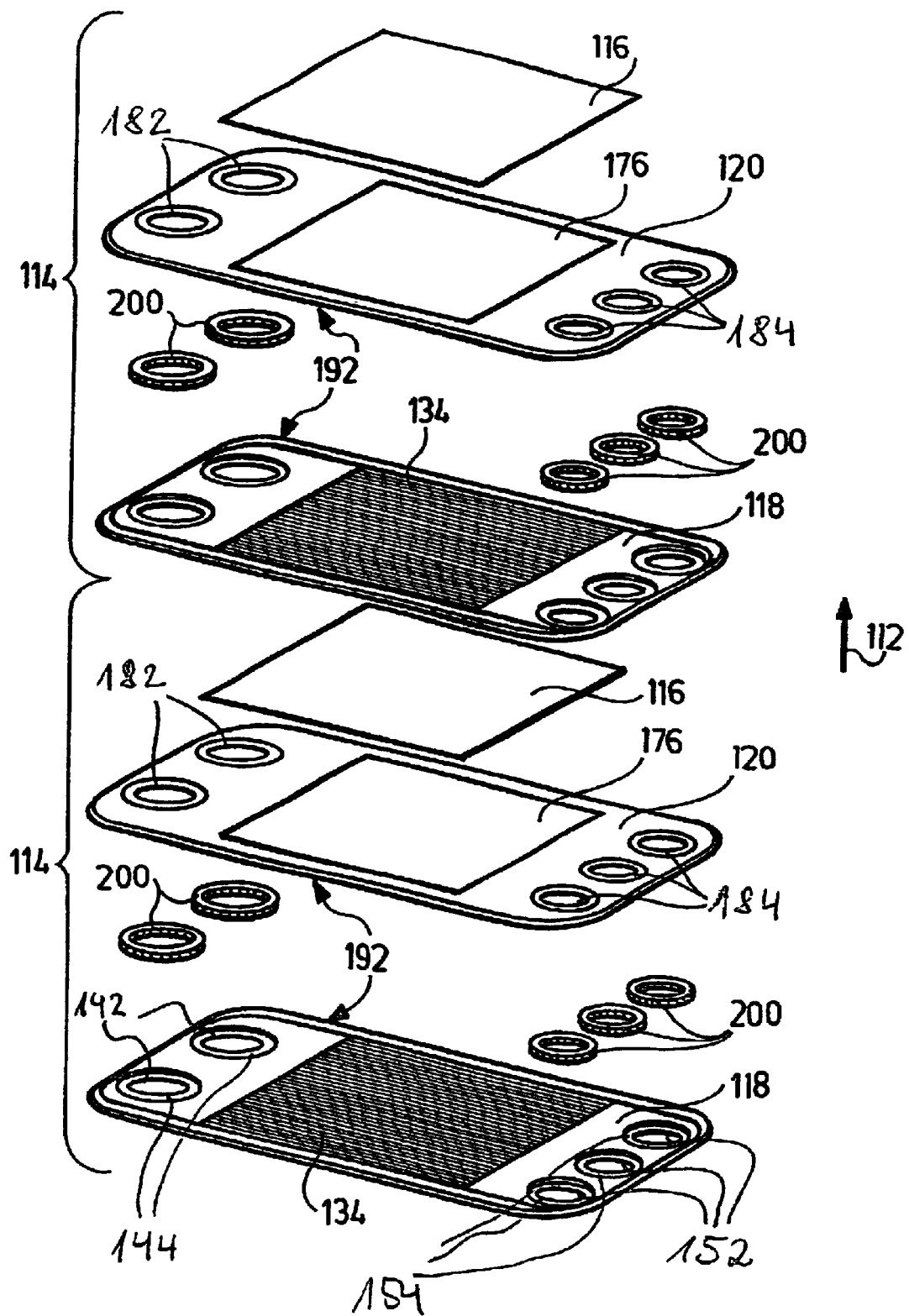

The invention relates to a high temperature resistant adhesive based on water glass.

Water-glass-based adhesives are, for example, known as cold-setting adhesives which are stable at high temperatures and are used, inter alia, for sticking materials based on calcium and aluminium silicates, fibrous cements or ceramics.

In the case of these adhesives, it is known that they are very stable at high temperatures and, moreover, that they are resistant to many chemicals and especially to acids, organic solvents, oil and petroleum.

However, a disadvantage of the known high temperature resistant adhesives based on water glass is that when they are used for sticking metallic substrates, they are inclined to emit gases or foam, especially at high temperatures i.e. in the temperature range above 700° C., this thereby causing the adhesive joint to weaken as well as leading to a reduction in the imperviousness thereof to liquids and gases.

In the past, resort has been made to the use of e.g. glass solders in order to stick together metallic substrates for use in high temperature fuel cells as is described in detail in EP 0 907 215 A1 for example.

High temperature resistant adhesives for metal substrates are of particularly significance when manufacturing fuel cells of this type, wherein a large number of sheet-like metal substrates are arranged one above the other in a stack and have to be connected together at certain areas thereof in gas-tight manner but must still be electrically insulated from one another.

In such an application, glass solders have proved to be adequately gas tight and have exhibited good electrical insulating properties as well as being temperature-stable in the extended temperature range >700° C.

Glass solders have the disadvantage however that the application thereof to the jointing positions is relatively complex and the actual adhesive connection can only be established thereafter. If the glass solders are subjected to temperature cycles whilst in operation as is usually the case when they are employed in high temperature fuel cells, then they tend to crack thereby losing the gas-tight nature of the jointing positions formed from the glass solder.

The object of the present invention is to propose a high temperature resistant adhesive which is particularly suitable for sticking metal substrates and which does not lose its gas-tight nature and electrical insulating properties even at high operational temperatures.

In accordance with the invention, this object is achieved in that boron nitride is utilised as an additive in a high temperature resistant adhesive having a water glass basis.

Surprisingly, due to the addition of boron nitride to the adhesive having a water glass basis, the tendency thereof to foam at high operational temperatures is suppressed to an adequate extent.

Very thin adhesive connections can thereby be produced, these nevertheless being adequately gas-tight, retaining their good electrical insulating properties even at high temperatures and not tending to form cracks when experiencing cyclic temperature changes.

Moreover, the adhesives in accordance with the invention are also suitable for sticking together metals and ceramics as well as two ceramic elements.

The effect of suppressing or repressing the tendency to foam of high temperature resistant adhesives based on water glass can be achieved with just small quantities of boron nitride i.e. by using a percentage by weight based upon the dry mass of 1% for example. The proportion of boron nitride that could be comprised in the adhesive is, to a large extent, variable and can be adapted to the particular requirements at the jointing position. The upper limit for the percentage by weight of boron nitride in the dry mass of adhesive is preferably kept to 40%.

It has frequently been found that extremely good adhesive properties, especially in regard to a very high level of gas-tightness of the jointing position and good insulating properties of the jointing position, are obtained by adding boron nitride to the adhesive in a range of 7 to 25% by weight based upon the dry mass of the adhesive.

The boron nitride is worked into the adhesive in the form of a particulate additive, it being advisable hereby to use boron nitride having an average particle size of 1 μm to 10 μm.

Particularly suitable products comprise boron nitride having a specific surface area in the range from 2 to 20 m²/g.

One of the preferred modifications of BN is the hexagonal, graphite-analogous form of BN.

The water glass component itself, which comprises a compound having the formula $$Me_2O*SiO_2,$$

is preferably used in a molar ratio $SiO_2:Me_2O \geq 2:1$ and especially >3 wherein Me preferably represents Na and/or K. The water glass component may also include lithium water glass or be formed entirely of lithium water glass.

A decisive factor for the high temperature stability of the adhesive is that the water glass component should exhibit a high melting point, in particular, that the melting point should lie in the range of from 1100 to 1150° C. or more.

Furthermore, in dependence on the requirements, one or more mineral fillers could be mixed with the adhesive, although here, care should be taken that the filler be selected such that it will be non-gassing up to a temperature of 1100° C. or more.

The particle size of the mineral fillers is not particularly critical. However, in view of the frequently sought for layer thicknesses for the jointing positions of approximately 10 to 100 μm, particles having an average size of approximately 0.5 to 30 μm and preferably 1 to 20 μm are used. In the case of laminate-type fillers such as mica for example, even larger dimensions in the plane of the lamina are possible since these will be aligned at least partially relative to the surface of the coated substrate when they are applied thereto.

The quantity of mineral filler in the adhesive may vary within wide limits. This enables the addition of the mineral filler to be effected such that the co-efficient of thermal expansion of the dry adhesive will be similar to that of the metal substrates being stuck together, in particular, steel.

A percentage by weight of mineral filler in the adhesive that has frequently proved to be expedient is one amounting to 1 to 40% and preferably 4 to 20% (again, as based upon the dry mass of the adhesive).

Hereby, the filler may also be used as a means for modifying the viscosity of the adhesive so that a thickening agent could be dispensed with in certain circumstances.

The preferred mineral fillers are kaolin, mica and talcum. However, other mineral fillers could be selected based upon the previously given rule that the mineral filler should not release gaseous components at temperatures of up to 1100° C.

It has been discovered that adhesives incorporating mineral fillers exhibit particularly good properties if kaolin is used as the main component of the filler compound or if it forms the only component thereof. However, kaolin can also be used successfully in mixtures of mica and talcum.

The percentage by weight of solid glass in the water glass component used in the adhesive is preferably 30 to 40%. If a relatively high proportion of boron nitride is used, then it is recommended that the water content of the total mixture be somewhat increased.

Furthermore, it may be advisable to add a dispersing agent to the adhesive, whereby, as a rule, a percentage by weight in the range of 0.1 to 5% and more preferably 0.4 to 1.5% based in each case upon the dry mass of the adhesive is frequently sufficient, especially for the purposes of stabilising mineral fillers that are dispersed throughout the adhesive in accordance with the invention.

Should only small quantities of filler be used or if such fillers are dispensed with completely, then it is recommended that a thickening agent, especially one in the form of silicic acid having a percentage by weight of up to 10% (based upon the dry mass of the adhesive), be added to the adhesive.

Furthermore, the invention relates to the use of an adhesive such as has been previously described for sticking together sheet-like substrates and especially for sticking layers of steel plate.

Hereby, elements from which fuel cells are made and which are in the form of sheet-like metal substrates are particularly suitable. The particular advantages of the high temperature resistant adhesive in accordance with the invention are particularly prominent here, since it is precisely here that it is necessary to have a jointing position which is stable at high temperatures, and one which moreover, is particularly gas-tight and also exhibits good insulating properties. All three of these requirements are fulfilled by the adhesive in accordance with the invention in an ideal manner. Moreover, the layers of adhesive are still flexible following the drying and curing process i.e. small elastic deformations of the metal substrate do not lead to the appearance of cracks in the adhesive components nor cause them to chip off.

Metal substrates that have been stuck together in this manner permit operational temperatures of up to 850° C. and occasionally even, somewhat more, without the adhesive properties and especially the gas-tightness and insulating properties thereof suffering therefrom.

The invention also relates to a method of sticking sheet-like metal substrates, wherein this is characterised in that an adhesive according to the invention of the type described hereinabove is applied to at least one of the areas that are to be stuck together (generally, at room temperature), in that the metal substrates that are to be stuck together are then placed in contact in at least the region of the jointing position and in that the adhesive is then dried and cured at a higher temperature.

The adhesive in accordance with the invention permits the adhesive to be applied at room temperature and thus considerably simplifies the handling of the adhesive in accordance with the invention. For example, the adhesive in accordance with the invention can be applied by means of a silk screen printing process. This thereby has considerable advantages in comparison with the glass solders that still have to be at least melted after the application thereof.

The drying of the adhesive preferably occurs at a higher temperature, in particular, at a temperature of 70° C. or above, and preferably at a temperature in the range of 70 to 80° C.

Finally, the invention relates to a fuel cell comprising a plurality of metal layers that are stuck together, wherein the process of sticking the metal layers is effected by means of an adhesive in accordance with the invention such as has been described hereinabove.

The invention will now be explained in greater detail hereinafter with the help of the drawing and the examples. In particular, FIG. 1 shows an exploded view of a high temperature fuel cell; and FIG. 2 a sectional view of a block of high temperature fuel cells in the assembled state.

FIG. 1 provides a perspective exploded view of two fuel cell units 114 arranged successively along the direction 112 of the stack. Each of the fuel cell units 114 comprises a substantially plate-like cathode-anode-electrolyte unit 116 (referred to hereinafter as a KAE unit for short) which is held between a contact plate 118 and a fluid guidance frame 120.

The KAE unit 116 comprises a gas permeable, electrically conductive substrate which may, for example, be in the form of a wire metal braiding, a wire metal fleece, a wire metal cloth, a wire metal woven fabric or it may be in the form of sintered or compressed metal particles consisting of porous bodies, so that a fuel gas can penetrate therethrough from a combustion chamber adjacent to the substrate.

Furthermore, the KAE unit 116 comprises a plate-like anode which is arranged on the substrate and consists, for example, of an electrically conductive ceramic material such as Ni—$ZrO_2$-cermet (ceramic—metal—mixture), and it also comprises a plate-like cathode which is in parallel with said anode and is formed from an electrically conductive ceramic material such as $LaMnO_3$ for example.

An electrolyte is disposed between the anode and the cathode, said electrolyte preferably consisting of a solid electrolytic material such as yttrium stabilised zirconium dioxide for example.

The contact plates 118 serve for leading those electrons, which have been freed by the reaction at the anode, away from the anode through the substrate i.e. for supplying the electrons required for the reaction at the cathode to said cathode.

To this end, each of the contact plates 118 consists of an electrically highly conductive metal plate which is provided with a plurality of parallel ribs that extend in the longitudinal direction of the contact plate 118 and form a contact region 134. These contact regions 134 comprise anode-side ribs which project upwardly and hence towards the anode of the KAE unit 116 appertaining to the same fuel cell unit 114, and also cathode-side ribs which project downwardly and thus towards the cathode of the KAE unit 116 appertaining to an adjacent fuel cell unit 114.

The cathode-side ribs of the contact region 134 are in electrically conductive surface contact with the cathode of the KAE unit 116 appertaining to an adjacent fuel cell unit 114 so that the electrons from the contact plate 118 can reach the cathode. The contact plates 118 thereby enable the charge between the anodes and the cathodes to be equalised in the direction 112 along the stack of successive KAE units 116.

Figure 2:
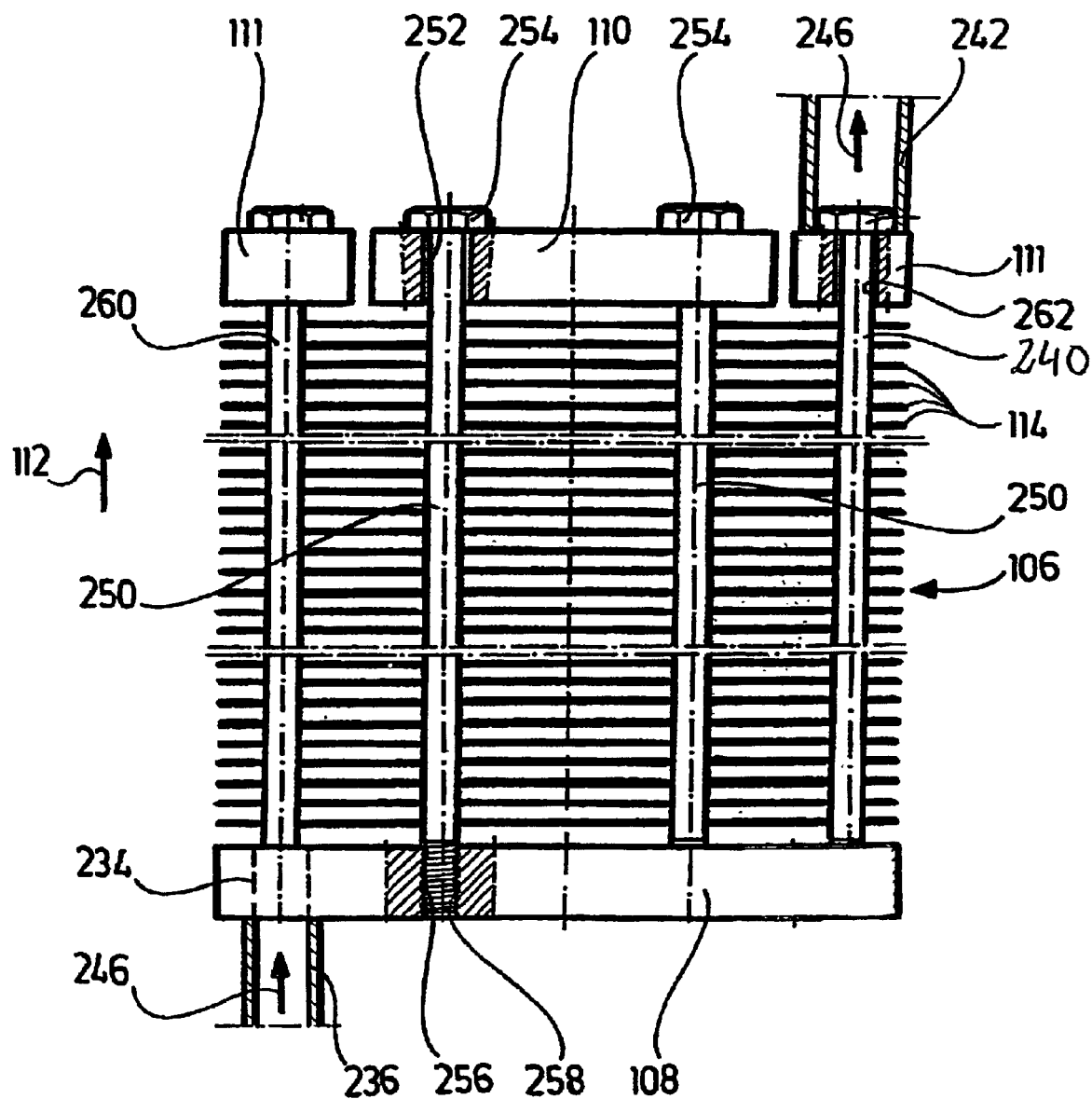

The contact plates 118 at the ends of a composite fuel cell block 106 (c.f. FIG. 2) are connected (in a not illustrated manner) to an external circuit in order to yield up the electric charges which form on these end contact plates 118.

A plurality, two for example, of substantially circular fuel gas passage openings 142 are formed in a lateral region of each one of the contact plates 118. Each of the fuel gas passage openings 142 is surrounded by a downwardly displaced annular rim region 144.

A lateral region of each contact plate 118 located opposite the abovementioned lateral region with respect to the contact area 134 is provided with a plurality, three for example, of substantially circular exhaust gas passage openings 152. Each of the exhaust gas passage openings 152 is surrounded by a downwardly displaced annular rim region 154.

The exhaust gas passage openings 152 in the contact plate 118 enable the exhaust gas, which contains excess fuel gas and combustion products, especially water, and which needs to be removed from the fuel cell units 114, to pass through the contact plate 118.

Each of the fluid guidance frames 120 comprises a substantially rectangular, central passage opening 176 for the passage of the KAE unit 116 of the same fuel cell unit 114.

A plurality, two for example, of substantially circular fuel gas passage openings 182 are formed in a lateral region of the fluid guidance frame 120 for enabling the fuel gas to pass through the fluid guidance frame 120.

In a lateral region located opposite the abovementioned lateral region with respect to the passage opening 176, there is provided a plurality, three for example, of substantially circular exhaust gas passage openings 184 which enable the exhaust gas that needs to be removed from the fuel cell units 114 to pass through the fluid guidance frame 120.

In each case, one fluid guidance frame 120 and one contact plate 118 together form a housing for a fuel cell unit 114. The fluid guidance frame 120 and the contact plate 118 of such a housing for a fuel cell unit 114 are* [*Translator's insertion] fixed together at the connecting flange 192 therebetween and then sealed together in gas-tight manner by means of an adhesive layer of the high temperature resistant adhesive in accordance with the invention.

Annular support elements 200 are arranged in the vicinity of the exhaust gas passage openings 152, 184, the lower faces of said elements resting on the upper face of a rim region 154 of a contact plate 118 surrounding an exhaust gas passage opening 152 whilst the upper faces of said elements rest against the lower face of the region surrounding an exhaust gas passage opening 184 in the fluid guidance frame 120.

In similar manner, support elements 200, which differ from the support elements 200 at the exhaust gas passage openings 152, 184 only in regard to the dimensions thereof, are arranged between the contact plate 118 and the fluid guidance frame 120 in the vicinity of the fuel gas passage openings 142, 182.

The support elements 200 serve to maintain the mutual spacing between the contact plate 118 and the fluid guidance frame 120 for the housing of a fuel cell unit 114 and thereby prevent the housing being compressed by the clamping force which is effective on the housing during the assembly of the composite fuel cell block 106 (c.f. FIG. 2).

The support elements 200 may be of massive construction and incorporate radially extending gas passage channels, although support elements 200 could also be used which are in the form of porous gas-pervious sintered elements consisting of a ceramic and/or a metallic material.

As can best be perceived from FIG. 1, the contact plates 118 and fluid guidance frames 120 that succeed one another in the direction 112 of the stack together with the respective support elements 200 arranged therebetween bound a plurality, three for example, of exhaust gas channels 240 into which the exhaust gas from the combustion chambers of the fuel cell units 114 can enter via the gas passage channels in the support elements 200, whereby said exhaust gas channels are separated in gas-tight manner from the central oxidation chambers in the fuel cell units 114 by means of the seals formed by the adhesive.

Such adhesive seals are also arranged in a corresponding manner between the rim regions 144 of the fuel gas passage opening 142 of each contact plate 118 and the fluid guidance frames 120 of a fuel cell unit 114 disposed below the relevant contact plate 118 in the direction 112 of the stack, said adhesive seals surrounding the respective fuel gas passage openings 142 and 182 in the contact plate 118 and the fluid guidance frame 120 in annular manner so that the contact plate 118 and the fluid guidance frame 120 that succeed one another in the direction 112 of the stack together with the respective support elements 200 and adhesive seals arranged therebetween form a plurality, two for example, of fuel gas channels 260 which extend in the direction 112 of the stack and from which the fuel gas can emerge via the gas passage channels in the support elements 200 into the combustion chambers of the fuel cell units 114, said fuel gas channels being separated in gas-tight manner from the central oxidation chambers in the fuel cell units 114 by means of the seals formed by the adhesive.

In accordance with the invention, the adhesive seals are each formed by a gas-tight, electrically insulating coating consisting of a high temperature resistant adhesive according to the invention which is applied in the form of a bead via a jet nozzle to the surface of the contact plate 118 or the surface of the fluid guidance frame 120 or which is applied thereto as a paste using a silk screen printing process or by means of a roller coating process.

Furthermore, the combustion chamber of each fuel cell unit 114 is separated in gas-tight manner from the central oxidation chamber of a fuel cell unit 114 disposed thereabove in the direction 112 of the stack by means of a combustion chamber seal which may likewise be formed by the high temperature resistant adhesive in accordance with the invention.

The fuel cell units 114 of the composite fuel cell block 106 of FIG. 2 are stacked upon one another in the direction 112 of the stack in such a manner that the cathode-side ribs of each contact plate 118 extend towards the cathode of the KAE unit 116 located therebelow and are in electrically conductive contact therewith.

The fuel gas passage openings 142, 182 and the exhaust gas passage openings 152, 184 are thereby respectively flush with one another in the direction 112 of the stack of successive fuel cell units 114 so as to form the respective fuel gas channels 260 and the exhaust gas channels 240.

As can be seen from FIG. 2, a fuel gas supply opening 234, which penetrates a lower end plate 108 of the composite fuel cell block 106 and is co-axial relative to the respective fuel gas channel 260, opens into each fuel gas channel 260 at the lower end thereof.

A fuel gas branch pipe 236, which leads to a (not shown) fuel gas supply, is connected to the end of the fuel gas supply opening 234 remote from the respective fuel gas channel 260.

The upper ends of the exhaust gas channels 240 of the composite fuel cell block 106 open into a respective exhaust gas removal opening 262 which is co-axial with the pertinent exhaust gas channel 240 and penetrates the lateral upper end plate 111 whilst being connected to a respective exhaust gas branch pipe 242 at the end thereof remote from the relevant exhaust gas channel 240.

These exhaust gas branch pipes 242 open into a (not shown) exhaust gas processing unit.

When the fuel cell device 106 is operational, the fuel gas flows through the fuel gas branch pipes 236 and the fuel gas supply openings 234 into the two fuel gas channels 260 and is distributed therefrom through the gas passage channels in the support elements 200 on the fuel gas channel side to the combustion chambers of the fuel cell units 114 which are enclosed by the respective contact plate 118, the fluid guidance frame 120 and the KAE unit 116 of the pertinent fuel cell unit 114.

The fuel gas is at least partially oxidised at the anode of the respective KAE unit 116 bounding the respective combustion chamber.

The product (water) of the oxidation process is passed together with the excess fuel gas out of the combustion chambers of the fuel cell units 114 through the gas passage channels in the support elements 200 on the exhaust gas side into the three exhaust gas channels 240 from where it is supplied to the (not illustrated) exhaust gas processing unit.

In order to enable the fuel cell units 114 that succeed one another in the direction 112 of the stack to be fixed together by means of an external clamping arrangement, there are provided a plurality of connecting bolts 250 (see FIG. 2) which penetrate into through-borings 252 in the central upper end plate 110 of the composite fuel cell block 106 and are provided with an external thread 256 at the end thereof remote from the respective bolt head 254, said thread being screwed into a respective threaded bore 258 in the lower end plate 108 of the composite fuel cell block 106 so that the central upper end plate 110 and the lower end plate 108 will be clamped together by means of the connecting bolts 250 whereby a desirable compressive force will be transmissible via the end plates 108, 110 to that central region of the stack of fuel cell units 114 which comprises the contact fields 134.

Due to the use of the high temperature resistant adhesive in accordance with the invention, the fuel cell units can be manufactured in an extremely economical manner and the jointing positions will remain gas-tight even at the high operational temperatures of the cells of 850° C. and more, whilst, in the dry state, they are sufficiently flexible as to easily resist the forces and distortions which occur when assembling the composite block of cells. In addition, during the starting procedure for the blocks of cells when the cell blocks are initially being raised to the operational temperature, the high quality of the high temperature resistant sealed regions formed by the adhesive in accordance with the invention is clearly evident. Here too, any elastic deformations of the metal layers that may occur will not produce disadvantageous consequences in regard to the gas-tightness of the connection between the support elements and the metal layers or between the metal layers.

The following examples concern formulations which can be successfully employed in the high temperature fuel cells for the purposes of forming the sealing regions as described hereinabove.

EXAMPLE 1

73 parts by weight of sodium water glass having a $SiO_2:Me_2O$ ratio of 3.3 and a solid glass content of approximately 35 parts by weight with 8 parts by weight of kaolin, 3 parts by weight of mica and 16 parts by weight of boron nitride (alpha BN, hexagonal, graphite-analogous BN, average particle size 4 μm).

The adhesive obtained in this manner is applied in the form of a bead via a jet nozzle to those metal or ceramic surfaces of a component of a high temperature fuel cell that are to be stuck together. The individual components of the fuel cell are brought together and the fuel cell block is dried at a temperature of 70 to 80° C. Curing of the jointing positions occurs when the block is first heated to the operational temperature. The jointing positions proved to be gas-tight and could withstand the operational conditions at 850° C. without problems during a prolonged test period. In addition, the electrical resistance values were sufficiently high at the operational temperature. In particular, no foaming was observed during the process of heating the cells up to the operational temperature. The jointing positions exhibited no crack formation even after carrying out several temperature cycles.

In dependence on the selected method of application, it may be desirable to increase the viscosity of the adhesive mass. For this, known viscosity modifying agents such as highly dispersed silicic acid can be used without affecting the properties of the adhesive connection in the case of the formulation indicated above. The amount of highly dispersed silicic acid in the total formulation preferably amounts to 0.2 to 5% parts by weight whereby one has a wide range of free play for adjusting the viscosity.

Should a lower viscosity be needed for the selected method of application, this can easily be achieved by adding water.

EXAMPLE 2

20 parts by weight of kaolin and 12 parts by weight of boron nitride (specifications as above) are added to 68 parts by weight of water glass. During testing, this formulation of the adhesive in accordance with the invention also gave results which were comparable to those of the formulation in Example 1.

EXAMPLE 3

7 parts by weight of kaolin, 4 parts by weight of talcum and 10 parts by weight of BN (specifications as above) are added to 79 parts by weight of water glass. During testing, satisfactory results comparable to those of Example 1 were again obtained.

EXAMPLE 4

An adhesive mixture containing 17% parts by weight of BN was obtained by adding BN to a commercially available cold adhesive based on water glass, namely Canol 460 produced by the company Segliwa GmbH, Wiesbaden, Germany.

This mixture can also be successfully employed as an adhesive for high temperature fuel cells.

What is claimed is:

1. Combination of an adhesive sticking together sheet substrates forming elements of a fuel cell and comprising metal and/or ceramic substrates, wherein the adhesive comprises a water glass component and an additive in the form of boron nitride, wherein the percentage by weight of solid glass in the water glass component is 20% to 50% and the percentage by weight of boron nitride based upon the dry mass of the adhesive is 1% to 40%, and wherein said adhesive provides a gas tight and electrically insulating bond between the substrates.

2. The combination in accordance with claim 1, characterised in that boron nitride having a percentage by weight based upon the dry mass of 7 to 25% is contained in the adhesive.

3. The combination in accordance with claim 1, characterised in that the boron nitride is present in particulate form having an average particle size of 1 μm to 10 μm.

4. The combination in accordance with claim 1, characterised in that the boron nitride is contained in the adhesive in the form of a hexagonal form of boron nitride.

5. The combination in accordance with claim 1, characterised in that the water glass component comprises a compound having the formula $$Me_2O * SiO_2$$

wherein the molar ratio $SiO_2:Me_2O>3$ and wherein Me represents Li, Na, and/or K.

6. The combination in accordance with claim 1, characterised in that the water glass component has a melting point in the range from 1100 to 1150° C.

7. The combination in accordance with claim 1, characterised in that the adhesive also comprises a mineral filler which is non-gassing up to a temperature of 1100° C. or more.

8. The combination in accordance with claim 7, characterised in that the quantity of mineral filler in the adhesive is such that the coefficient of thermal expansion of the dry adhesive is substantially the same as that of steel.

9. The combination in accordance with claim 7, characterised in that the percentage by weight of the mineral filler in the adhesive (based upon the dry mass thereof) is 1 to 40%.

10. The combination in accordance with claim 7, characterised in that the mineral filler is selected from kaolin, mica, and/or talcum.

11. The combination in accordance with claim 9, characterised in that the percentage by weight of the mineral filler in the adhesive (based upon the dry mass thereof) is 4 to 20%.

12. The combination in accordance with claim 1, characterised in that the percentage by weight of solid glass in the water glass component is 30 to 40%.

13. The combination in accordance with claim 1, characterised in that it also comprises a dispersing agent having a percentage by weight of 0.2 to 5% (based upon the dry mass of the adhesive).

14. The combination in accordance with claim 1, characterised in that the adhesive also comprises a quantity of a thickening agent.

15. The combination in accordance with claim 14, characterised in that the thickening agent comprises silicic acid having a percentage by weight of up to 10% based upon the dry mass of the adhesive.

16. The combination in accordance with claim 1, characterised in that the substrates are subjected to an operational temperature of up to 850° C.

17. A fuel cell comprising a plurality of metal layers that are stuck together by an adhesive which comprises a water glass component and an additive in the form of boron nitride, wherein the percentage by weight of solid glass in the water glass component is 20% to 50% and the percentage by weight of boron nitride based upon the dry mass of the adhesive is 1% to 40%, wherein said adhesive provides a gas tight and electrically insulating bond between the metal layers.

* * * * *

UNITED STATES PATENT AND TRADEMARK OFFICE
CERTIFICATE OF CORRECTION

PATENT NO. : 6,949,306 B2 Page 1 of 1
DATED : September 27, 2005
INVENTOR(S) : Thomas Anhorn et al.

It is certified that error appears in the above-identified patent and that said Letters Patent is hereby corrected as shown below:

Title page,
Item [73], Assignee, replace with -- ElringKlinger AG, Dettingen (DE) --.

Column 9,
Line 14, delete the "." after "1100°C".

Signed and Sealed this

Twenty-ninth Day of November, 2005

JON W. DUDAS
*Director of the United States Patent and Trademark Office*